Sept. 10, 1957 — M. E. LARSEN — 2,805,869
SAFETY PLOW HITCH
Filed June 13, 1952 — 2 Sheets-Sheet 2
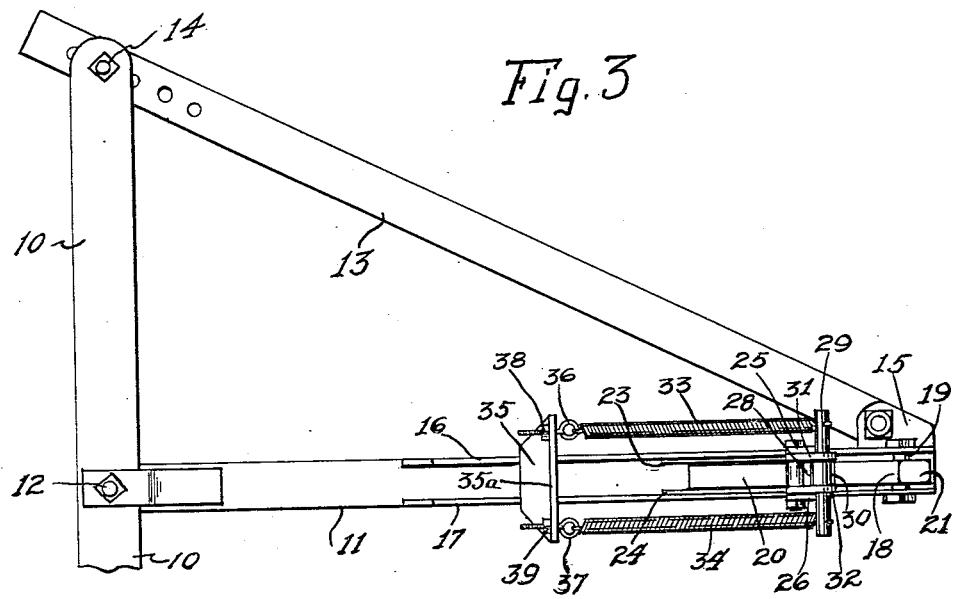
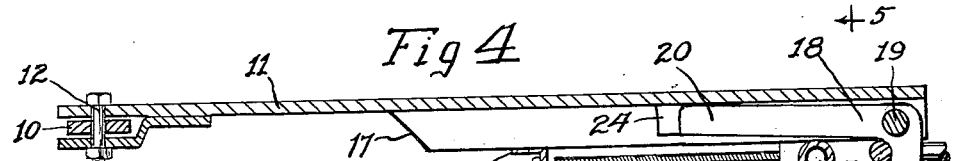
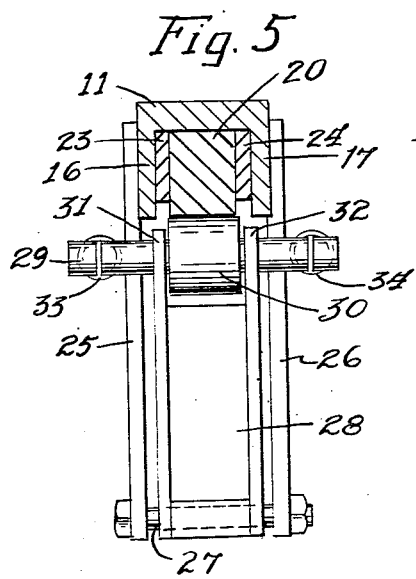
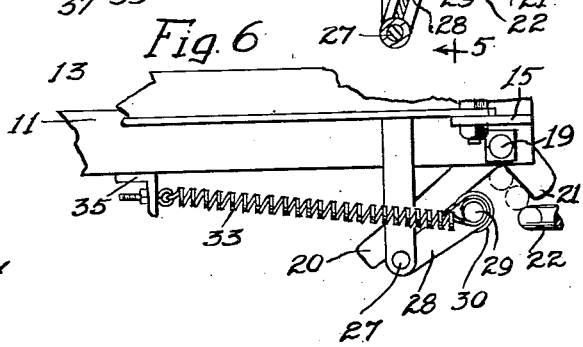
INVENTOR.
Milner E Larsen
BY Greek Wells
Atty 2,805,869

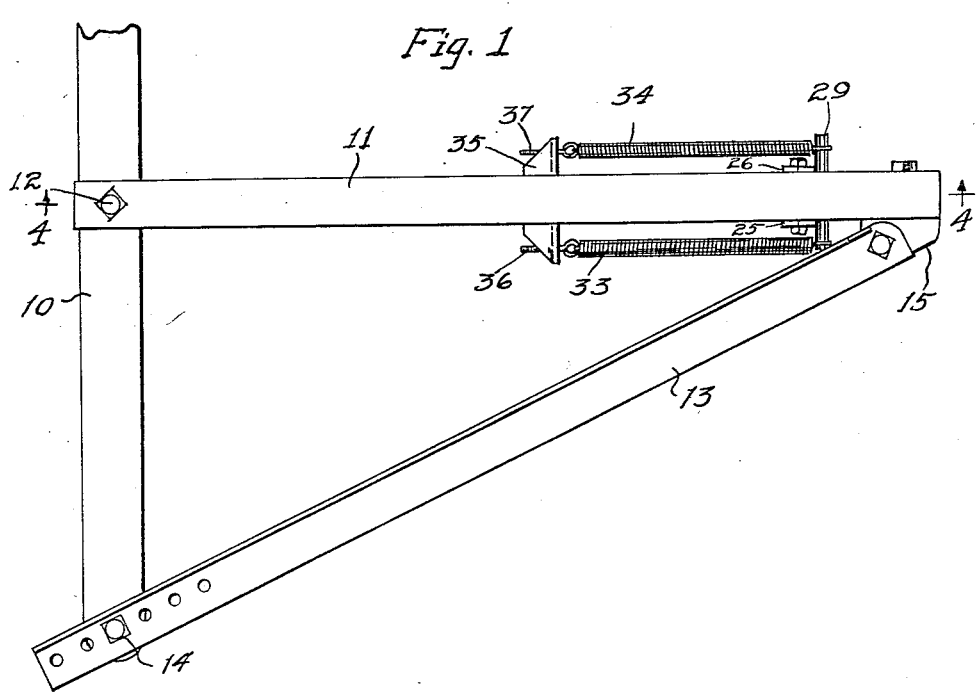
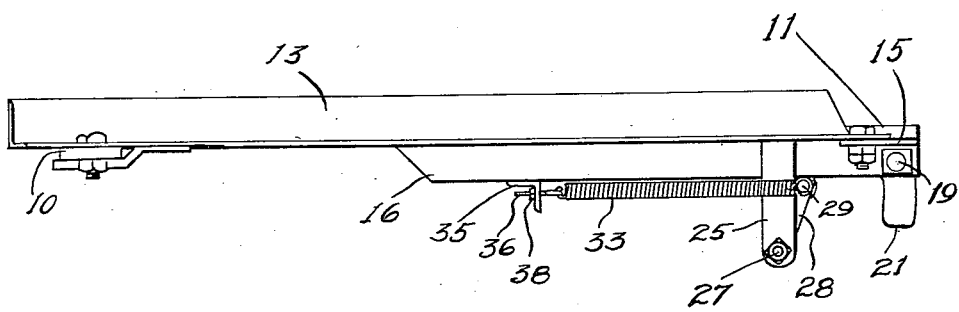

SAFETY PLOW HITCH

Milner E. Larsen, Bickleton, Wash.

Application June 13, 1952, Serial No. 293,384

2 Claims. (Cl. 280—452)

My invention relates to safety hitches for plows and has for its principal purpose the provision of a hitch device which can be utilized to connect the tow bar of the plow to the draft implement of the towing vehicle in such a fashion that a sudden excessive jerk or pull, due to the plow striking an obstruction, will release the draft vehicle from the tow bar, the hitch being simple and so constructed to have a quick release with a maximum resistance in the normal towing position. My novel plow hitch embodies an inverted channel shaped tow bar, an L-shaped hook member pivoted in the front end of the towbar, in combination with a wedging mechanism, including a wedging arm pivoted below the tow bar and extending upwardly and forwardly to engage and hold one leg of the hook member in the channel of the tow bar. The wedging arm has a roller at the top and springs extend rearwardly from the upper end of the wedging arm and are secured to the tow bar to hold the wedging arm in normal position. When the plow is suddenly stopped, the excessive force on the hook member causes the wedging arm to snap forward and allows the hook member to release the draft vehicle. As soon as the draft vehicle is released, the parts return to normal position.

It is a specific purpose of my invention to provide a simple safety plow hitch consisting of few parts, utilizing a wedging arm, an L-shaped hook member and a spring in such a fashion that the initial and immediate effect caused by an obstruction stopping the plow is a forward movement of the pull receiving portion of the hook member and a rapid multiplication of the leverage in favor of the release of the hook member from the draft vehicle.

The nature and advantages of my invention will appear more fully from the following description and the accompanying drawings wherein a preferred form of the invention is illustrated. The drawings and description are illustrative only, however, and various minor modifications may be made without departing from the scope of the invention as it is expressed in the claims.

In the drawings:

Figure 1 is a plan view of the tow bar portion of the plow hitch embodying my invention;

Figure 2 is a view in side elevation of the tow bar;

Figure 3 is a bottom plan view of the tow bar illustrating the position of the hook member and the wedging arm;

Figure 4 is a sectional view taken on the line 4—4 of Figure 1;

Figure 5 is an enlarged sectional view taken on the line 5—5 of Figure 4; and

Figure 6 is a fragmentary view in side elevation showing the parts in released position.

Referring now in detail to the drawings, my invention is shown as applied to the front draft bar 10 of a plow. A tow bar 11 is secured to the draft bar 10 by a bolt 12. A brace 13 extends from the front end of the tow bar 11 rearwardly and laterally to the draft bar 10 where it is secured by a bolt 14. The front end of the brace 13 is bolted to an ear 15 that is provided at the front end of the tow bar 11. The front portion of the tow bar 11 is of inverted channel shape, having two side flanges 16 and 17. An L-shaped hook member 18 is pivotally secured in the front end of the tow bar by a pivot pin 19. The long leg portion 20 of the hook member 18 lies in the channel of the tow bar while the short leg portion 21 thereof extends downwardly to receive a draft member 22 of a towing vehicle.

The flanges 16 and 17 are reenforced by bars 23 and 24. Two arms 25 and 26 are affixed to the outside of the flanges 16 and 17 and extend downwardly below the tow bar. A pivot pin 27 through the lower ends of the arms 25 and 26 pivotally mounts a wedging arm 28. The wedging arm 28 carries a cross shaft 29 at its upper end on which a roller 30 is pivoted in position to wedge against the leg 20 of the hook member 18. The wedging arm 28, as shown, is bifurcated at its upper end to provide ears 31 and 32 for mounting the shaft 29 with the roller confined between the ears 31 and 32. Two springs 33 and 34 are fixed to the shaft 29 outside of the arms 25 and 26. These springs 33 and 34 extend rearwardly to a cross bar 35 that is secured to the flanges 16 and 17 of the tow bar 11. Threaded eye bolts 36 and 37 are secured to the rear ends of the springs 33 and 34 and pass through the flanges 35a of the cross bar 35 and nuts 38 and 39 provide means for adjusting the tension of the springs 33 and 34.

In normal operation the parts remain in the position shown in Figures 2 and 4 with the wedging arm 28 slightly inclined forwardly. The springs 33 and 34 hold the shaft 29 against the arms 25 and 26 which provide a definite stop limiting the movement of the wedging arm 28 toward upright position. In this position the roller 30 presses upwardly against the leg 20 of the hook member 18. The forward pull by the draft member 22 on the leg 21 of the hook member 18 will pull the plow. The down draft of the plow with the weight of the tow bar parts keeps the draft member in the position shown in Figure 4. Whenever the plow strikes an obstruction such as a rock buried in the ground, the impact is quite sudden and a tremendous strain suddenly develops at the connection of the draft member 22 and the hook member portion 21. If this exceeds the safe limit provided by the hitch, enough downward force will be applied to the leg 20 of the hook member 18 to furnish a forward component of force on the wedging arm 28 to overcome the pull of the springs 33 and 34. This instantly snaps the hook member to the position shown in Figure 6, allowing the draft member 22 to slip off the leg 21 of the hook member 18 without at any time stopping the forward motion of the draft member 22.

It is believed that the operation and simplicity of my safety hitch will be apparent from the foregoing description. The advantages obtained are primarily due to utilization of the L-shaped hook member 18 in combination with the wedging arm 28 and its roller 30 together with the springs 33 and 34. The normal pull on the plow causes a downward force on the leg 20 of the hook member 18 which is mostly absorbed as an end thrust on the wedging arm 28. The springs 33 and 34 need only have enough tension to overcome the small horizontal component of the force acting on the leg 20. The roller 30 is a valuable aid in avoiding sticking of the parts which would nullify the ability of the safety hitch to release. It is to be noted that whenever the horizontal component of the force communicated to the wedging arm 28 by the leg 20 is sufficient to start the roller in a forward direction, along the leg 20, the leg 21 starts to swing forward, the wedging action of the arm 28 becomes less and the horizontal component of the force on the leg 20 increases. The resulting release of the draft member 22 from the leg 21 is almost instantaneous.

As soon as the release of the draft member 22 takes place, the springs 33 and 34 can swing the parts back to normal operating position as illustrated in Figure 4. The wedging arm 28 is prevented from going too far by engagement of the shaft 29 with the parts 25 and 26.

Having thus described my invention, I claim:

1. A safety hitch for plows etc., comprising a tow bar having side flanges at its forward end, an L-shaped hook member, pivot means at the corner of said hook member pivoting said member between the side flanges of the tow bar so that the shorter leg of the hook member will extend downwardly from the tow bar when the longer leg thereof extends rearwardly along the tow bar between said side flanges, supports immovably fixed to the tow bar rearwardly of the pivot means, a wedging arm having its lower end pivoted in the supports and extending upwardly and forwardly from its pivot, a cross shaft at the top of the wedging arm, a roller on the shaft engaging the long leg of the hook member, and coiled springs attached to the cross shaft and extending rearwardly outside said supports and attached to the tow bar to hold the cross shaft against the supports.

2. A safety hitch for plows etc., comprising a tow bar having side flanges at its forward end, an L-shaped hook member, pivot means at the corner of said hook member pivoting said member between the side flanges of the tow bar so that the shorter leg of the hook member will extend downwardly from the tow bar when the longer leg thereof extends rearwardly along the tow bar between said side flanges, supports immovably fixed to the tow bar rearwardly of the pivot means, a wedging arm having its lower end pivoted in the supports and extending upwardly and forwardly from its pivot, a cross shaft at the top of the wedging arm, said cross shaft extending outwardly across the supports, a roller on the shaft engaging the long leg of the hook member, a cross bar on the tow bar spaced rearwardly from said supports, and coiled springs connecting the ends of said shaft to the cross bar, said springs being under tension and holding the roller wedged against the long leg of the hook member, the shaft engaging the supports to limit the rearward movement of the roller.

References Cited in the file of this patent

UNITED STATES PATENTS 1,872,750  Ketel _____ Aug. 23, 1932